INVENTOR
JEAN ALBERT FRANÇOIS SUNNEN
ATTY

United States Patent Office 3,197,605
Patented July 27, 1965

3,197,605
CONSTRICTED ELECTRIC ARC APPARATUS
Jean Albert François Sunnen, Brussels, Belgium, assignor to La Soudure Electrique Autogene Procedes Arcos, Brussels, Belgium, a corporation of Belgium
Filed Jan. 29, 1962, Ser. No. 169,341
Claims priority, application France, Feb. 6, 1961, 851,835
3 Claims. (Cl. 219—76)

The present invention relates to electric arc apparatus and more particularly to an apparatus for the production of a constricted electric arc flashing between the free end of a first electrode and an inlet of a second electrode which is hollow and disposed coaxially with the first electrode, the ionised gases produced by the said arc being propelled beyond the other end of the hollow electrode, called outlet end, by means of compressed argon circulating round the end of the first electrode in order to protect said first electrode, passages also being formed in the hollow electrode for introducing into said electrode at points between its inlet and outlet jets of a compressed gas directed laterally towards the axis of said electrode.

Apparatus of this kind is known in which a lateral passage is formed in a hollow electrode in order to introduce into the constricted arc, pulverulent material which is to be projected hot on to a work piece. The pulverulent material which is introduced into the arc is either melted by the heat of the arc before encountering the said piece or projected in a solid condition on to said piece to which it adheres because it is sufficiently softened by the heat of the arc. In this known apparatus, the axis of the above lateral jet is directed perpendicularly to the axis of the hollow electrode or forms with latter axis an acute angle, the apex of which is slightly nearer the inlet of the hollow electrode than the place where this jet enters into the hollow of the electrode. The result is that this jet presents, parallel to the axis of the hollow electrode, a component which is either of no influence at all or is opposed to the electromagnetic flux which propels the arc into the electrode in conjunction with the argon protecting the first electrode.

The object of the present invention is to increase the efficiency of the constricted arc both in cases where it serves to apply material to a piece to be treated and in cases where it serves, in known manner, only to heat said piece, for example, in order to cut it, or in cases where it serves to produce chemical synthesis.

In the apparatus according to the present invention passages in the hollow electrode are formed in such a manner that the jets which issue from them form, with the axis of the hollow electrode, acute angles having their apices situated further from the inlet of the hollow electrode than the places where these jets penetrate into the hollow of the electrode.

In this apparatus, the direction of the jets of the second gas which penetrate in the ionised gases produced by the arc, downstream of the region where the arc flashes, causes an increase of the kinetic energy of the ionised gases, which eventually serve to carry away molten or solid particles.

It has already been proposed to use an apparatus for the production of a constricted electric arc to project material, molten or in a pulverulent state, onto a piece to be heat-treated, for example, to weld one piece to another or to cover a piece with a layer of material which adheres thereto as a result of sufficient softening of the material of which it is formed. It has also been proposed not to project any substance onto the piece to be welded and to introduce into the apparatus a reactive gas which is greatly heated on contact with the constricted arc. In a particular case of the latter application, pieces of metal are cut by means of the constricted arc in the presence of a gas which assists cutting, for example, hydrogen added to the protective gas of the first electrode.

In some of the known apparatus, the metal to be projected is introduced either in the form of wire or in the form of powder suspended in a flow of gas into a chamber where the arc flashes between a first electrode and the inlet of the hollow electrode. The material which is to be carried through it must penetrate into the arc at the place where the latter flashes, but at this place the electrode is hottest and the material has a tendency to adhere thereto. In certain cases, mixtures of gases are used in order to improve the transfer of heat, for example, to the piece to be cut or to heat chemical reactive gases.

The introduction of these gases upstream of the region from which the arc flashes increases the risk of deterioration of the electrodes at the anode or cathode stains, by chemical means in the case of a reactive gas (for example $O_2$, $CO_2$, $H_2$) by heat means in the case of a gas having a high thermal conductivity ($H_2$, $N_2$, He).

In other known apparatus, the first electrode is of an incombustible material and has its end protected by a first gas which penetrates between it and an auxiliary hollow electrode serving to assist the start of the arc, whilst the principle hollow electrode, that is to say, the electrode from which the arc flashes to effect the work for which it is intended, is separated from the auxiliary hollow electrode by an annular chamber in which either a second gas alone or a second gas carrying powder in suspension is introduced through a side duct.

The first electrode is connected to the current source which is also connected, on the one hand, directly to the main hollow electrode and, on the other hand, indirectly to the auxiliary hollow electrode, by means of a resistance, the value of which is such that when the arc flashes the current in the circuit of the auxiliary hollow electrode is considerably less than in the circuit of the main hollow electrode, for example, 30 times less. Therefore, at its inlet into the principal hollow electrode, the arc which has passed through the said annular chamber undergoes a very high local increase in temperature. At this place the principal hollow electrode is also subjected to a large flow of heat.

Just as in the case of the above described apparatus, the introduction of the gases upstream of the region from which the arc flashes increases the risk of deterioration of the electrodes at the anode and cathode stains, by chemical means in the case of a reactive gas such as oxygen, carbon anhydride or hydrogen, and by heat means in the case of a gas having a high thermal conductivity such as hydrogen, nitrogen or helium.

It should also be noted that, in these two kinds of apparatus in which the second gas is introduced into a chamber from which the arc flashes before penetrating into the single hollow electrode or into the principal hollow electrode, the second gas does not penetrate in the arc in the form of jets. Moreover, this second gas opposes the penetration of the first protective gas into the chamber, with the result that it is necessary to keep the later at a pressure which is greater than that of the second gas.

Also, there is welding apparatus in which the end of the first electrode is protected by a gas which then circulates with a constricted arc in a hollow electrode, whilst an extra screen of protective gas is formed round the portion of the arc which also flashes beyond the outlet of this hollow electrode as far as the piece to be welded which is connected to the current source. The effect of this second screen is to oppose the expansion of the arc which tends to occur at the outlet of the hollow electrode and to increase the protection of the welding bath, but this extra screen of protective gas does no have the effect of effectively increasing the heating effect of the arc on the piece to be welded.

In the absence of material carried by the gas, the cutting or grooving effect is increased. If molten or solid particles are carried, these particles are projected more violently on to the piece to be treated.

In a preferred embodiment applicable in cases where a consumable wire is melted in the arc, this wire is guided into the portion of the constricted arc which has received the second gas in the hollow electrode. Furthermore, the passages by which the jets of the second gas flow into the hollow electrode are directed in such manner that the axes of these jets meet the axis of the hollow electrode at a maximum distance of a few millimetres from the point at which the axis of the consumable wire meets the axis of the hollow electrode.

The invention will be further described by way of examples with reference to the accompanying drawings in which.

Figure 2:
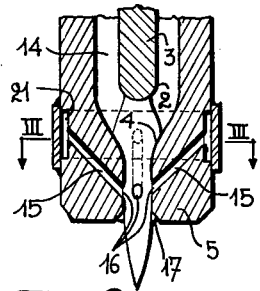
FIGURE 2 is a section similar to that of FIGURE 1 of part of another embodiment of the invention suitable for the cutting of materials.
Figure 3:
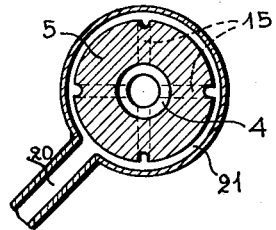
FIGURE 3 is a section along the line III—III of FIGURE 2.

FIGURES 4, 6, 8 and 10 are sections similar to that of FIGURE 2 of four further embodiments of the invention suitable for welding; and FIGURES 5, 7, 9 and 11 are sections similar to that of FIGURE 3 taken along the lines V—V, VII—VII, IX—IX and XI—XI of FIGURES 4, 6, 8 and 10 respectively.

In the various figures, the same reference numerals indicate the same components.

Figure 1:
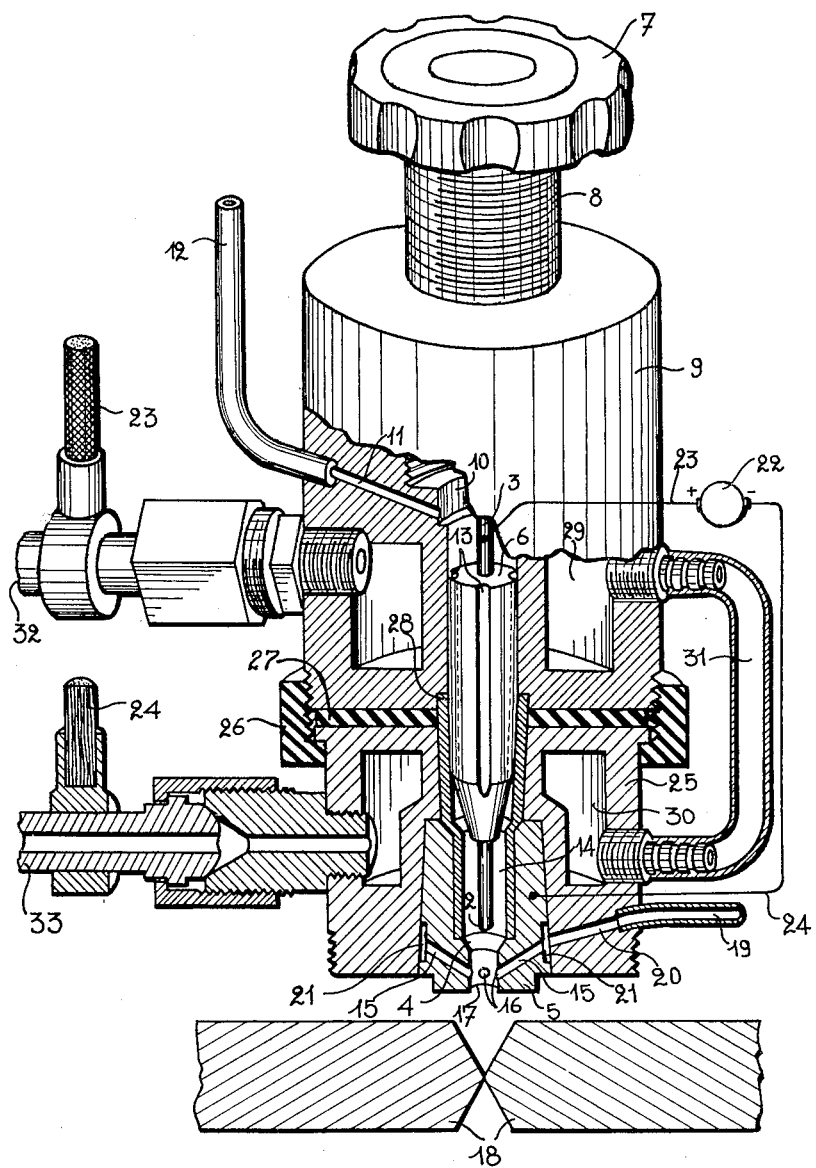
FIGURE 1 is a perspective, partially in section, of a first embodiment of the invention suitable for the welding of two work pieces by means of a mixture of powders fed through the apparatus.

With reference to FIGURE 1, an apparatus is shown for the production of a constricted electric arc between a free end 2 of a first electrode 3, for example of a refractory material, and an inlet 4 of a hollow electrode 5 which is disposed coaxially with the first electrode 3. The axial position of the first electrode 3 in an electrically conductive guide 6 can be controlled by rotating a knob 7 connected to a screw 8 engaged in a member 9 forming the upper part of the apparatus.

This member 9 includes a chamber 10 in which a compressed non-reactive gas such as argon may be fed through a duct 11 connected to a tube 12 communicating with a supply container (not shown). The gas passes through grooves 13 formed on the periphery of the guide 6 into a chamber 14 in which the end 2 of the electrode 3 is located and issues from this chamber through the hollow electrode 5 protecting the free end of the first electrode.

Passages 15 are formed in the electrode 5 for introducing jets of a second compressed gas into the hollow thereof, at places such as 16 located between the inlet 4 and the outlet 17 thereof which gas serves to bring powders into the arc for forming a welding path on work pieces 18 and eventually for protecting this bath from atmospheric air. The passages 15 are formed such that the axes of these portions in the regions of the places where the passages open into the electrode make with the axis of the hollow electrode acute angles having their apices situated further from the inlet 4 of the hollow electrode than the places 16 where the passages 15 open into the hollow of the electrode.

The mixture of powder is fed to the passages 15 through a tube 19 connected to a duct 20 which communicates with an annular groove 21 in which the various channels 15 terminate.

The electrical connection of the first electrode 3 and the hollow electrode 5 is shown schematically as if these two electrodes were directly connected to a current source 22 by conductors 23 and 24. It is clear that the latter may be connected merely to outer surfaces of metal members, insulated from one another but in electrical contact with the electrodes 3 and 5 respectively. In FIGURE 1 it is apparent that the electrode 5 is in electrical contact with a metal member 25 in the lower portion of the apparatus which is fixed to the upper member by means of a tapped insulating ring 26 which urges it against an insulating disc 27. The member 28 which is in contact simultaneously with the members 9 and 25 is also an insulating member and is for example made of refractory material.

Within members 9 and 25 chambers 29 and 30 are formed in communication with one another by means of a rubber tube 31 for the circulation of a fluid coolant. The coolant is introduced through a first metal pipe 32 and is evacuated through a second metal pipe 33. Electrical conductors 23 and 24 are fixed to these pipes and serve to connect the electrodes 3 and 5 to the current source 22.

In the embodiment of the apparatus shown in FIGURES 2 and 3 only compressed gas passes through the passages 15. This embodiment is suitable for the cutting of materials. The length of the arc emanating beyond the outlet end of the hollow electrode increases for any given pressure when the value of the acute angle which the axes of these passages make with the axis of the hollow electrode is decreased. In FIGURE 2 it is apparent that this angle is approximately 45° but it may be of advantage to use a smaller angle.

Figure 4:
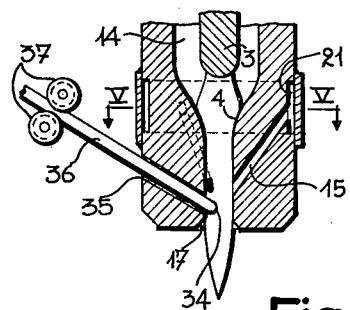
Figure 5:
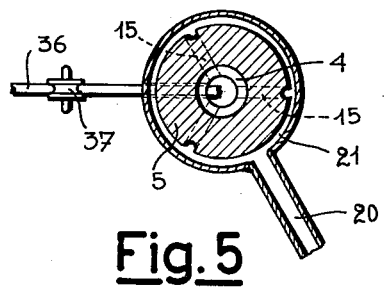

In the embodiment shown in the FIGURES 4 and 5, the angle which the axes of the passages 15 make with the axis of the hollow electrode is less than 35°. These passages convey only compressed gas into this electrode. The axes of the passages intercept at a point 34 through which also passes the axis of a further passage 35 serving as a guide for a wire 36 the composition of which depends on the nature of the metal to be deposited which is projected onto the work by the various gas jets. This wire is preferably provided with a flux intended to form slag. However, in certain cases it is unnecessary to employ a flux of this nature if the gas fed through the inclined passages and that originating from the chamber 14 are capable of protecting the metal from the outer air. The wire 36 is driven by rollers 37 carried by the apparatus at the same rate as it is fused in the arc.

Figure 6:
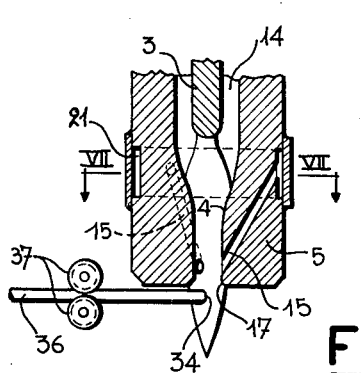
Figure 7:
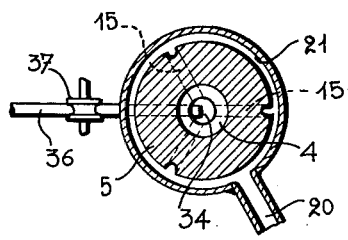

In the embodiment shown in FIGURES 6 and 7 the acute angle which the passages 15 make with the axis of the hollow electrode is less than 30°. The point of intersection 34 of the axes of the passages is this time outside the hollow electrode 5. The wire 36 is also directed in such manner that its axis passes approximately through this point. There may be a space of a few millimetres between the axis of the wire and the point 34. For a given gas pressure the kinetic energy of the material projected by the gas jets increases as the acute angle which the passages 15 make with the axis of the hollow electrode decreases.

Figure 8:
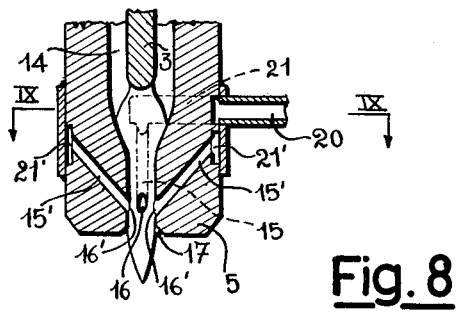
Figure 9:
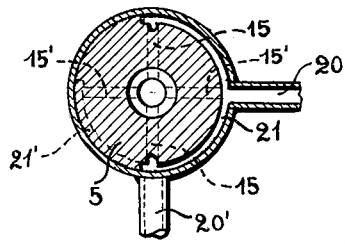

In the embodiment shown in FIGURES 8 and 9 in addition to the argon protecting the end of the electrode 3 as it circulates in the chamber 14, another compressed gas is passed through the duct 20 into a semi-annular groove 21.

This other gas carries into the electrode powders of a metal or other substances to be deposited hot at the outlet of the apparatus. The jets of powder in suspension in this gas penetrate the arc through two passages 15, the axes of which intersect at the same point as the axes of two other passages 15' which communicate with another semi-annular groove 21'. The latter is traversed by another powder suspended in gas fed through a conduit 20'.

Figure 10:
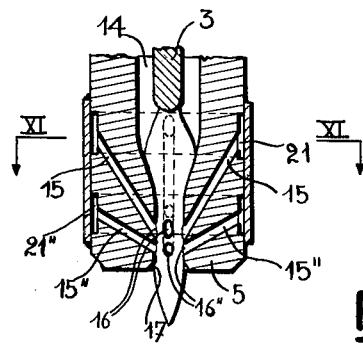
Figure 11:
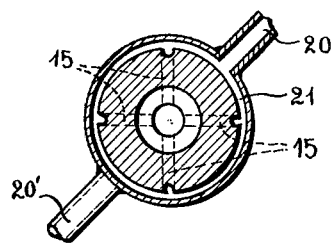

The passages 15 and 15' of FIGURES 8 and 9 have the same inclination and their outlet apertures 16 on the same level, but it is also possible to have the same point convergence for the axes of the different passages by distributing them in several groups having different inclinations and their outlet apertures 16 at different levels. This is what is shown in FIGURES 10 and 11 in which four passages 15 are shown, fed through an annular groove 21 and having their outlet ends 16 on a different level from that of outlet openings 16" of four other passages 15" making with the axis of the hollow electrode 5, an acute angle greater than that made by the passages 15 with this axis. The passages 15" are terminated in an annular groove 21" communicating with a conduit 20" which feeds another powder suspended in a compressed gas.

By using two powders carried by different gases the composition of the total deposit may be easily changed by a variation in the proportion of two gases or of the quantity of material suspended in one of the gases or in both gases.

It is obvious that the invention is not exclusively limited to the embodiments illustrated and that many modifications can be made to the form, arrangement, and constitution of some of the components used in the construction of the apparatus without departing from the scope of the present invention.

It is obvious, for example, that the electrode 3 is not necessarily a refractory electrode and that in cases where it is of fusible metal, it may be accompanied by an inner or outer flux. Its continuous feed may then be effected by known means.

What I claim is:

1. An apparatus for treating a workpiece, comprising a first electrode, a second electrode provided with a hollow portion disposed coaxially with the first electrode and having an inlet adjacent the free end of the first electrode and an outlet spaced therefrom, means for applying between these two electrodes a voltage sufficient for flashing an electric arc between a free end of the first electrode and the inlet of the second electrode, means for delivering argon under pressure around the free end of the first electrode and through the hollow portion of the second electrode in order to propel ionized gases formed in the arc through said hollow portion and beyond the outlet of the same, passages in said second electrode opening into said hollow portion at a place intermediate the inlet and outlet thereof, means for supplying a gas under pressure through said passages, the axis of the portion of these passages in the region of the place where the passages open into said hollow portion making with the axis of said hollow portion an acute angle having its apex situated further from the inlet of the hollow portion than the said place, and a wire-guide for a consumable wire directing the latter towards the axis of the hollow portion in such a manner that the point of intersection of the axis of the consumable wire with the axis of the hollow portion is at a maximum distance of a few millimetres from the point of intersection of the axes of the jets issuing from said passages into the hollow portion with the axis of the latter.

2. An apparatus as claimed in claim 1, in which said points of intersection are all within said hollow portion of the second electrode, said hollow portion being cylindrical.

3. An apparatus for treating a workpiece, comprising a first electrode, a second electrode provided with a hollow portion disposed coaxially with the first electrode and having an inlet adjacent the free end of the first electrode and an outlet spaced therefrom, means for applying between these two electrodes a voltage sufficient for flashing an electric arc between a free end of the first electrode and the inlet of the second electrode, means for delivering argon under pressure around the free end of the first electrode and through the hollow portion of the second electrode in order to propel ionized gases formed in the arc through said hollow portion and beyond the outlet of the same, passages in said second electrode opening into said hollow portion at a place intermediate the inlet and outlet thereof, the axis of the portion of said passages in the region of the place where the passages open into said hollow portion making with the axis of said hollow portion an acute angle having its apex situated further from the inlet of the hollow portion than the said place, means for supplying a gas under pressure with a powder suspended therein to some of said passages, and means for delivering a gas under pressure with another powder suspended therein to other of said passages, the openings into said hollow portion of some of said passages being at a shorter distance from the inlet of the hollow portion of said second electrode than that of the openings into said hollow portion of other of said passages.

References Cited by the Examiner
UNITED STATES PATENTS

| | | | |
|---|---|---|---|
| 2,862,099 | 11/58 | Gage | 219—74 |
| 2,973,426 | 2/61 | Casey | 219—75 |
| 2,982,845 | 5/61 | Yenni et al. | 219—76 |

RICHARD M. WOOD, *Primary Examiner.*